(No Model.)
W. C. HAMILTON.
FRUIT GRADER.
No. 427,687. Patented May 13, 1890.
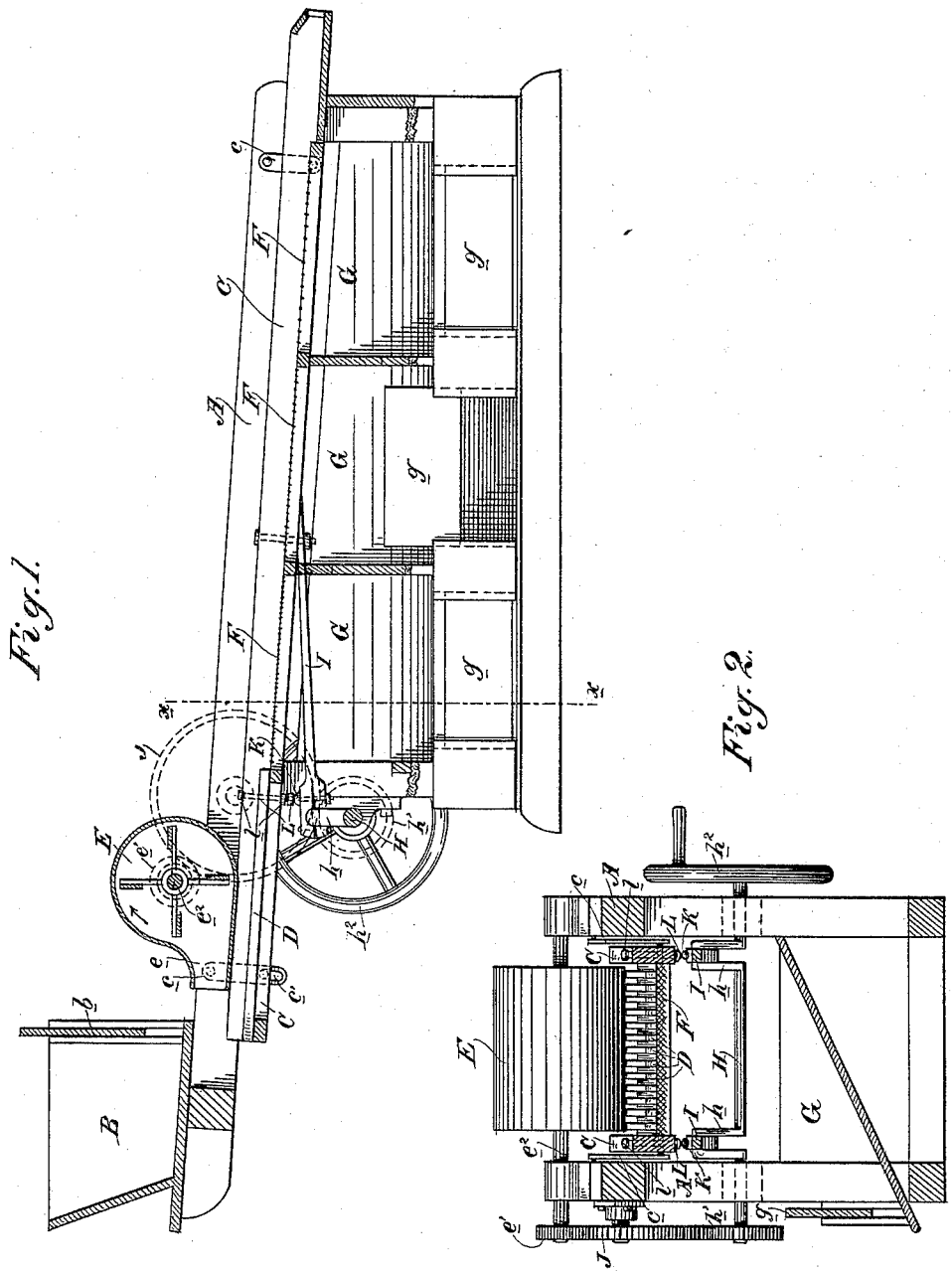

UNITED STATES PATENT OFFICE.

WILLIAM C. HAMILTON, OF SAN JOSÉ, CALIFORNIA.

FRUIT-GRADER.

SPECIFICATION forming part of Letters Patent No. 427,687, dated May 13, 1890.

Application filed November 22, 1889. Serial No. 331,238. (No model.)

*To all whom it may concern:*

Be it known that I, WILLIAM C. HAMILTON, a citizen of the United States, residing at San José, Santa Clara county, State of California, have invented an Improvement in Fruit-Graders; and I hereby declare the following to be a full, clear, and exact description of the same.

My invention relates to that class of machines which are used for separating fruit according to size, and usually termed "fruit-graders."

My invention consists in the novel arrangement and combination of parts hereinafter fully described, and specifically pointed out in the claims.

The object of my invention is to provide a simple and effective grader, and one which is not liable to become clogged.

Referring to the accompanying drawings for a more complete explanation of my invention, Figure 1 is a longitudinal vertical section of the machine, the gate $g$ being shown in elevation. Fig. 2 is a vertical cross-section on line $x$ $x$ of Fig. 1.

A is the main frame of the machine, consisting of suitable uprights and longitudinal side timbers. Mounted at the head of the frame is the supply or feed hopper B, having in its front a vertically-adjustable gate $b$, by which the fruit is fed upon the grated surface below.

Suspended by hangers $c$ at each side of the head and foot of the main frame A is an inclined shaking-frame C. At the head of this frame is a grated surface D, consisting of a number of separated parallel bars, and upon the head of which the fruit is directly delivered from the hopper.

E is a fan-blower, the exit or mouth $e$ of which is so arranged as to deliver its blast directly upon the fruit as it falls from the hopper onto the head of the grated surface.

In the shaking-frame C and below the grated surface is a series of screens (represented by F.) These screens are separate from one another and are graduated as to their mesh—that is to say, the screen at the head of the series has the smallest mesh, the next has a mesh a little larger, and the next has a mesh still larger—and this series may be indefinitely continued within the reasonable limits of the dimensions of the machine.

In the lower portion of the main frame are made the separate compartments G for receiving the fruit. One of these compartments lies directly under each screen, and they are made with sloping bottoms, the lower ends of which are provided with vertically-adjustable gates $g$.

A shaking movement is imparted to the frame C by means of a cross-shaft H, mounted at the head of the main frame, and having cranks $h$, from which extend the pitmen I to the shaking-frame, with which they are connected. Upon the end of the shaft H is a pinion $h'$, with which a spur-gear J engages, said gear meshing with the pinion $e'$ on the end of the fan-blower shaft $e^2$, whereby motion is imparted to the fan. The shaft H is operated by means of a crank-wheel $h^2$ on one end or other power mechanism.

In addition to the shaking movement which is imparted to the frame C, I impart to it also a jarring movement in a vertical plane, the object of which will be presently described. This is effected by providing for a suitable contact between the pitmen-heads and the side bars of the frame C. This contact I prefer to make by means of a headed bolt K, passing through the pitman head or box, and a headed bolt L, passing through the side bars of the shaking-frame, and receiving a nut $l$ above and below, whereby it may be raised up and down, so as to adjust it for regulating the contact. At each revolution of the pitman-head the head of the bolt K coming in contact with the head of the bolt L gives a vertical jar to the shaking-frame, so that said frame is jarred up and down, and this jar may be regulated by the adjustment of the bolt L. In order to provide for this jar, I make a slot $c'$ in the lower end of the hangers $c$ at the head of the frame, so that the frame may have an up-and-down movement in the slot of the hangers.

The operation of my machine is as follows: The fruit of all sizes is supplied to the hopper B, and by it is fed down upon the head of the grated surface D. In its fall from the hopper to said surface a blast of air from the blower encounters it, and thereby blows away a good portion of the leaves, dust, and other débris. The fruit falling upon the grated surface is shaken back and forth and jarred up and down by the movement of the frame, and through said surface passes the remainder of the débris, such as the stems and other extraneous substances which were not separated by the air-blast. On account of the general inclination of the grated surface and the longitudinal movement and its jarring movement, the fruit passes down the grated surface and onto the series of screens, where the smaller fruit drops through the first screen, the size larger through the next screen, the size larger through the third screen, and so on. Any tendency to clog is obviated by the jarring movement which the table receives, for by this sudden movement up and down, due to the contact of the bolts K and L, any fruit which is sticking in the holes of the screens is either jarred through or is jarred upwardly again and moved on down. The separated fruit falls into the different receptacles below, and is by them discharged through the gates into suitable receptacles.

Having thus described my invention, what I claim as new, and desire to secure by Letters Patent, is—

1. In a fruit-grader, a grading table or frame and the pivoted links or hangers by which it is suspended, in combination with the crank-shaft H, the pitmen I, connected with said crank-shaft and with the table or frame, whereby a shaking movement is imparted thereto, and the contact-bolts K and L between the pitmen-heads and the shaking frame or table, whereby a vertical jar is imparted to the latter, substantially as herein described.

2. A fruit-grader consisting of the combination of the main frame, the shaking-frame C, suspended in said main frame and having a series of graduated screens, and a grated surface at its head consisting of parallel spaced bars, the separate compartments in the lower portion of the main frame under the series of screens, the feed-hopper at the head, the fan-blower adapted to direct a blast of air upon the falling fruit, and the means for shaking frame C, imparting a vertical jar to it, and operating the fan-blower, consisting of the cross-shaft having the cranks, the pitmen connecting the cranks with the shaking-frame, the contact-bolts K and L between the pitmen-heads and the shaking-frame, and the gears $h'$, J, and $e'$ between the crank-shaft and the fan-blower shaft, substantially as herein described.

In witness whereof I have hereunto set my hand.

WILLIAM C. HAMILTON.

Witnesses:
S. H. NOURSE,
H. C. LEE.